(12) United States Patent
Huang et al.

(10) Patent No.: US 11,644,369 B2
(45) Date of Patent: May 9, 2023

(54) OPTICAL FIBER DEGRADATION MONITORING BY DISTRIBUTED TEMPERATURE SENSING

(71) Applicant: NEC Laboratories America, Inc., Princeton, NJ (US)

(72) Inventors: Ming-Fang Huang, Princeton, NJ (US); Yaowen Li, Princeton, NJ (US)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 16/878,063

(22) Filed: May 19, 2020

(65) Prior Publication Data

US 2020/0370970 A1 Nov. 26, 2020

Related U.S. Application Data

(60) Provisional application No. 62/851,135, filed on May 22, 2019.

(51) Int. Cl.
*G01K 11/3206* (2021.01)
*G01M 11/00* (2006.01)
*G01K 13/00* (2021.01)
*G01K 11/324* (2021.01)

(52) U.S. Cl.
CPC .......... *G01K 11/3206* (2013.01); *G01K 13/00* (2013.01); *G01M 11/3109* (2013.01); *G01K 11/324* (2021.01)

(58) Field of Classification Search
USPC ......................................... 374/45, 131, 124
See application file for complete search history.

(56) References Cited

U.S. PATENT DOCUMENTS

2004/0140421 A1 7/2004 Dammann
2016/0298960 A1* 10/2016 Hill ........................ G01R 31/58

* cited by examiner

*Primary Examiner* — Mirellys Jagan
(74) *Attorney, Agent, or Firm* — Joseph Kolodka (57) ABSTRACT

Aspects of the present disclosure describe monitoring of optical fiber by distributed temperature sensing (DTS) and determining optical fiber degradation and/or abnormal environmental events including landslides, fires, etc., from DTS data.

6 Claims, 8 Drawing Sheets

OPTICAL FIBER DEGRADATION MONITORING BY DISTRIBUTED TEMPERATURE SENSING

CROSS REFERENCE

This disclosure claims the benefit of U.S. Provisional Patent Application Ser. No. 62/851,135 filed May 22, 2019 the entire contents of which is incorporated by reference as if set forth at length herein.

TECHNICAL FIELD

This disclosure relates generally to distributed temperature sensing systems, methods, and structures. More particularly, it describes the monitoring of optical fiber by distributed temperature sensing.

BACKGROUND

As is known in the art, millions and millions of miles of optical fiber cable have been deployed worldwide as part of contemporary communications systems—including fiber located in underground conduits, hanging on poles and other structures, and positioned inside of buildings. Given such widespread deployment—systems, methods and structures that facilitate the identification of optical fiber degradation would be a welcome addition to the art.

SUMMARY

An advance in the art is made according to aspects of the present disclosure directed to systems, methods, and structures for optical fiber cable monitoring by distributed temperature sensing (DTS) over the optical fiber cable itself.

In sharp contrast to the prior art, systems, methods, and structures according to aspects of the present disclosure utilizes DTS to monitor the optical fiber cable to determine abnormal environmental events including earthquake, landslide, fires, etc.

Advantageously, and according to further aspects of the present disclosure, the DTS is performed over optical fiber cable carrying live telecommunications traffic and additionally employs Raman-based optical time domain reflectometry (OTDR) to determine installation problems/errors and/or optical fiber differences occurring over the length of the optical fiber cable.

BRIEF DESCRIPTION OF THE DRAWING

A more complete understanding of the present disclosure may be realized by reference to the accompanying drawing in which:

FIG. 2(A), and FIG. 2(B) are plots illustrating.

FIG. 4(A), and FIG. 4(B), are plots of.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that service providers that have deployed/are deploying optical fiber telecommunications infrastructure have employed remote fiber monitoring systems to aid in the maintenance and diagnosis of the optical fiber. Such monitoring systems facilitate the continuation of a quality of service and ability to detect/track degradation of that fiber that may lead to undesired service failure(s).

Different systems and methods to monitor optical fiber have been employed by the service providers—and others—such methods including chemical coding of fiber cables, monitoring amplifier noise, and optical time domain reflectometry (OTDR). Notwithstanding the utility of such contemporary monitoring systems and methods, a continuing need exists for improvements to optical fiber monitoring.

As we shall now show and describe, systems, methods, and structures according to aspects of the present disclosure advantageously employ distributed temperature sensing (DTS) along an optical fiber (cable) to determine cable degradation and cable "health". As we shall show further, our Raman-based OTDR technology employed with DTS provides more sensitive results as compared with traditional OTDR for optical fiber cable health monitoring. Of further advantage, systems, methods, and structures according to aspects of the present disclosure determine temperature(s)

along the length of the optical fiber cable, and allow for integration with artificial intelligence (AI) based machine learning operations and algorithms resulting in remarkably fast and precise determination of location(s) of fiber degradation.

Figure 1:
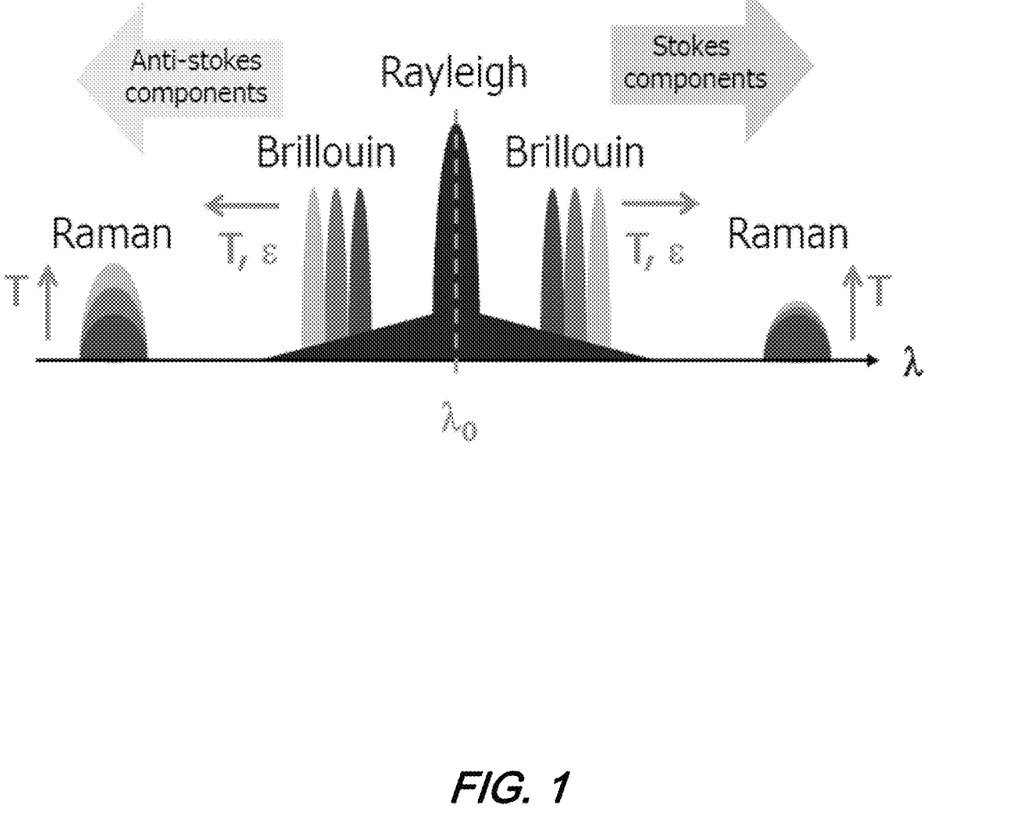
FIG. 1 shows a schematic diagram illustrating principles of optical back scattering.

Turning now to FIG. 1 there is shown a plot illustrating principles of optical back-scattering that are employed in systems, methods, and structures according to aspects of the present disclosure. As will be appreciated by those skilled in the art, by measuring the amplitude(s) of stokes and anti-stokes components of scattered interrogation signals, the temperature(s) along the length of an optical fiber cable may be determined. As we shall show and describe, Raman scattering may be employed not only for temperature measurement but for continuous cable health monitoring and fiber degradation detection as well.

Figure 2A:
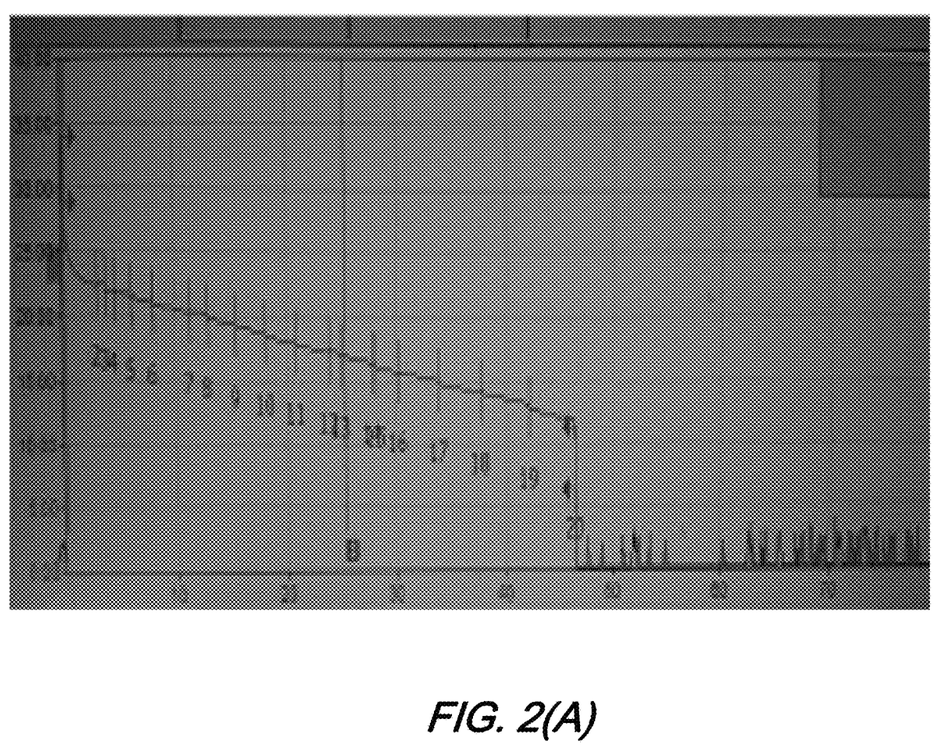
FIG. 2(A) traditional optical time domain reflectometry (OTDR)
Figure 2B:
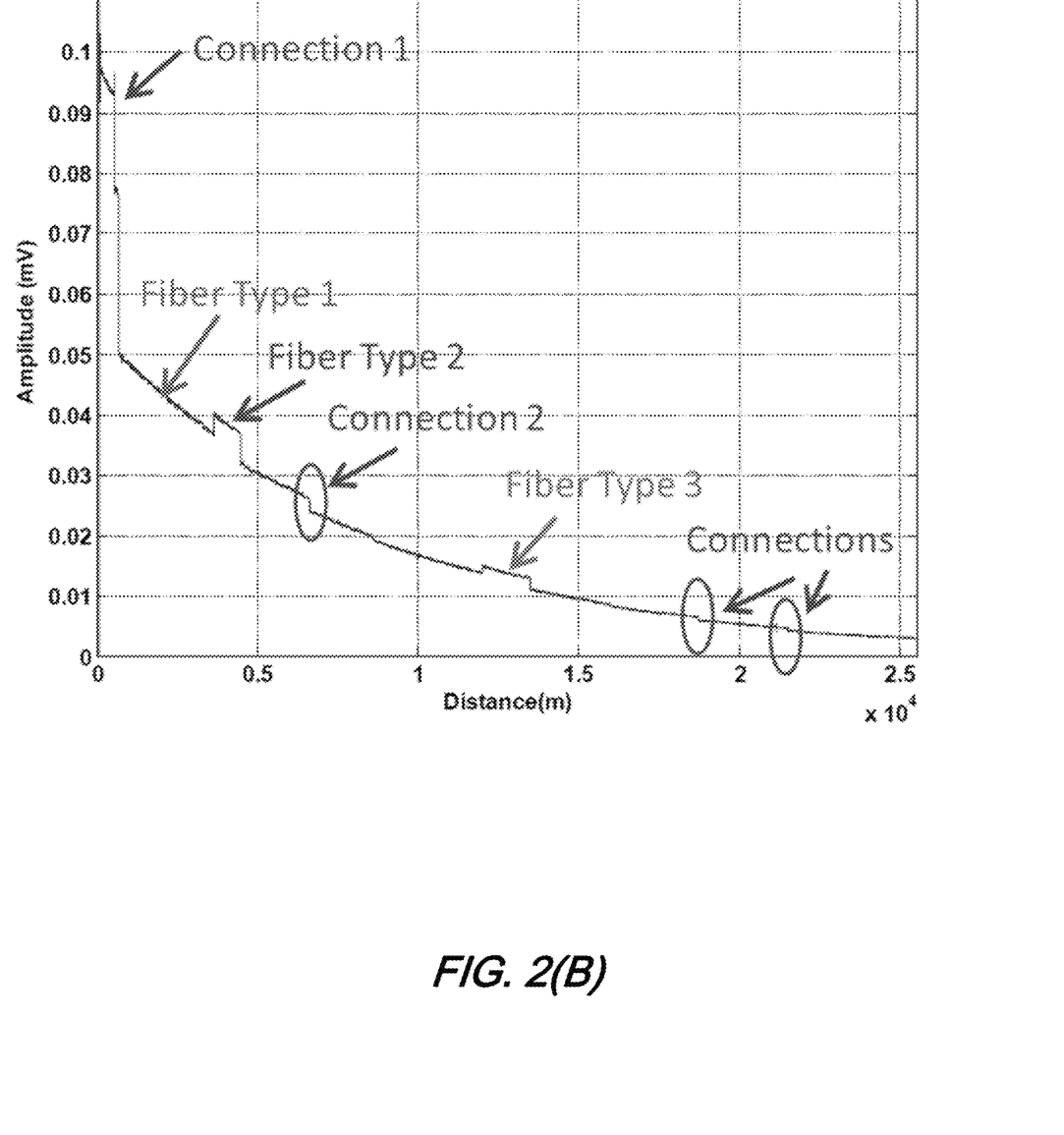
FIG. 2(B) Raman OTDR, according to aspects of the present disclosure.

FIG. 2(A), and FIG. 2(B) are plots illustrating: FIG. 2(A) traditional optical time domain reflectometry (OTDR) and; FIG. 2(B) Raman OTDR, according to aspects of the present disclosure. As may be observed from those figures—and based on different measurement wavelength(s), R-OTDR with $\lambda \cong 1450$ nm is more sensitive to bending loss as compared to OTDR at $\lambda$ of 1550 nm. This may be due to the fact that the attenuation of optical fiber at the wavelength of 1550 nm is less than shorter wavelengths. In other words, the signals at 1450 nm are more sensitive to fiber attenuations such as connector loss, splicing loss, bending loss, etc.

Typically, in a telecom carrier/service provider optical fiber infrastructure, single mode fiber (SMF) and Corning® LEAF® optical fiber are oftentimes used due—in part—to similar signal attenuation at 1550 nm. Hence, as illustrated in FIG. 2(A), different types of fiber are not discoverable by OTDR. In sharp contrast, in the R-OTDR trace illustrated in FIG. 2(B), it is shown that there are two sections of different fiber type in the length(s) around 4.5 and 13 km. As those skilled in the art will appreciate, such measurement(s) will help engineers and/or service persons to identify the particular fiber used in a route for maintenance considerations.

Figure 3:
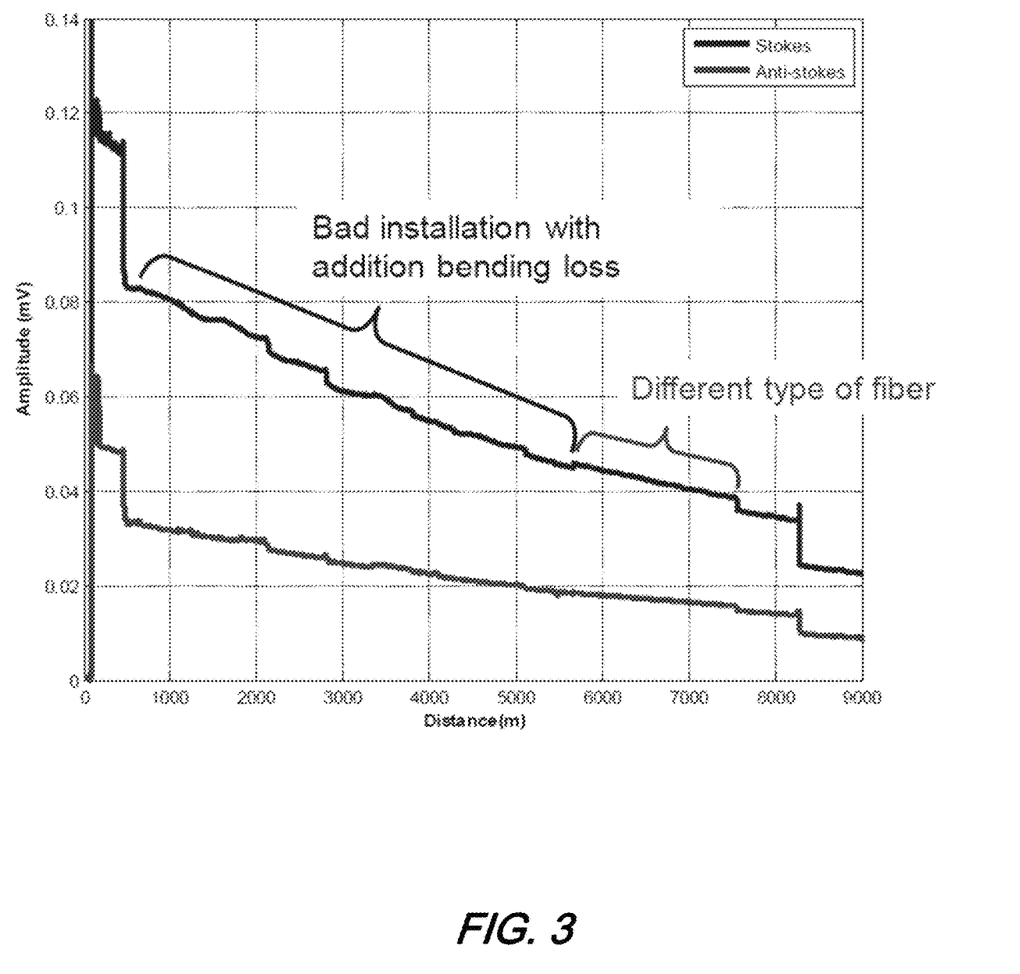
FIG. 3 is a graph depicting illustrative determination of a bad fiber installation discovered by Raman based OTDR (R-OTDR) according to aspects of the present disclosure.

FIG. 3 is a plot showing illustrative examples of bad fiber installation that are discoverable by R-OTDR. As may be observed by inspecting that figure, the cable has a bad installation in the range of 500-5500 m and a different type of fiber. Such is the type information that is not discoverable by traditional, prior art OTDR.

Figure 4A:
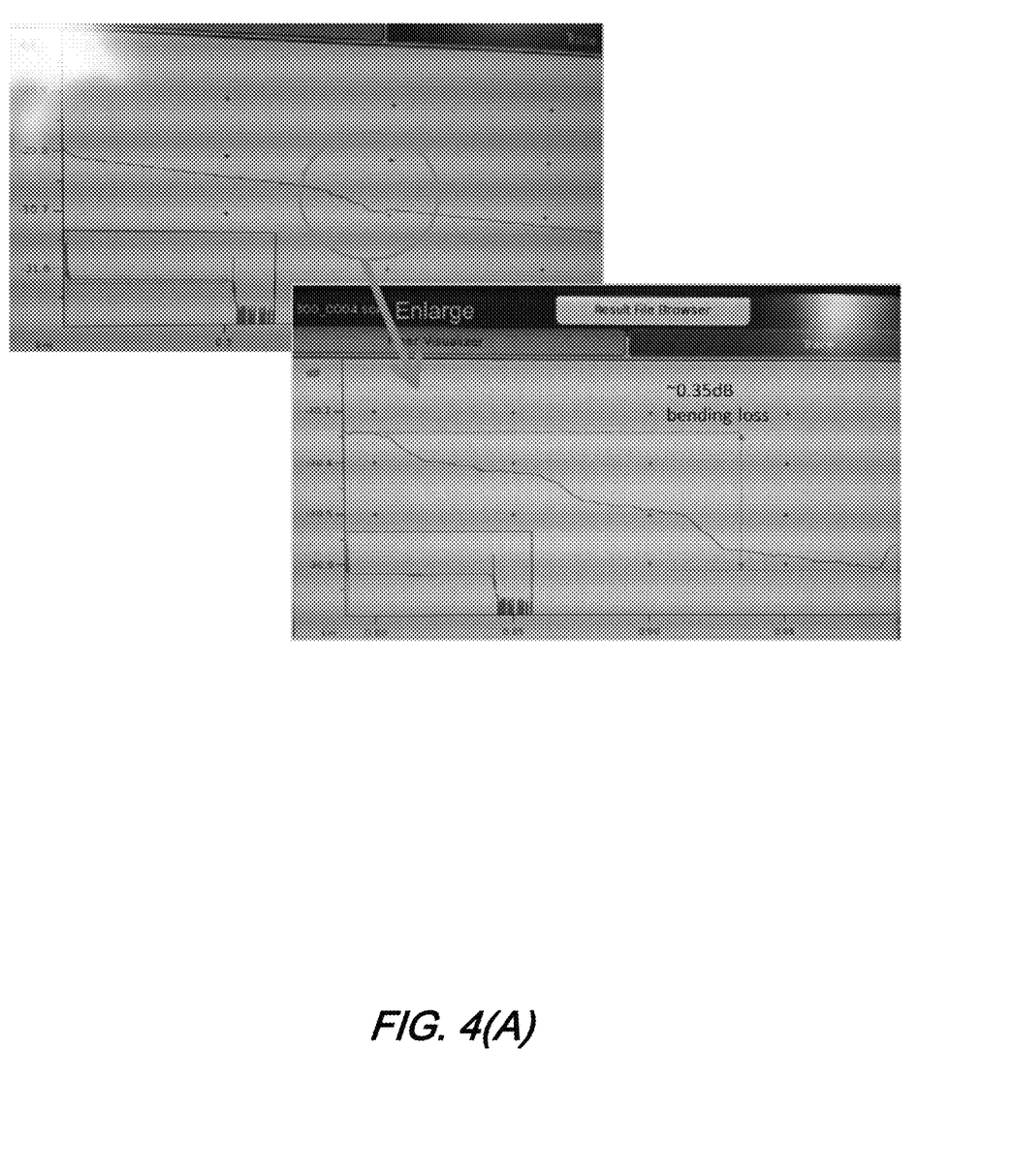
FIG. 4(A) OTDR trace for bending loss.
Figure 4B:
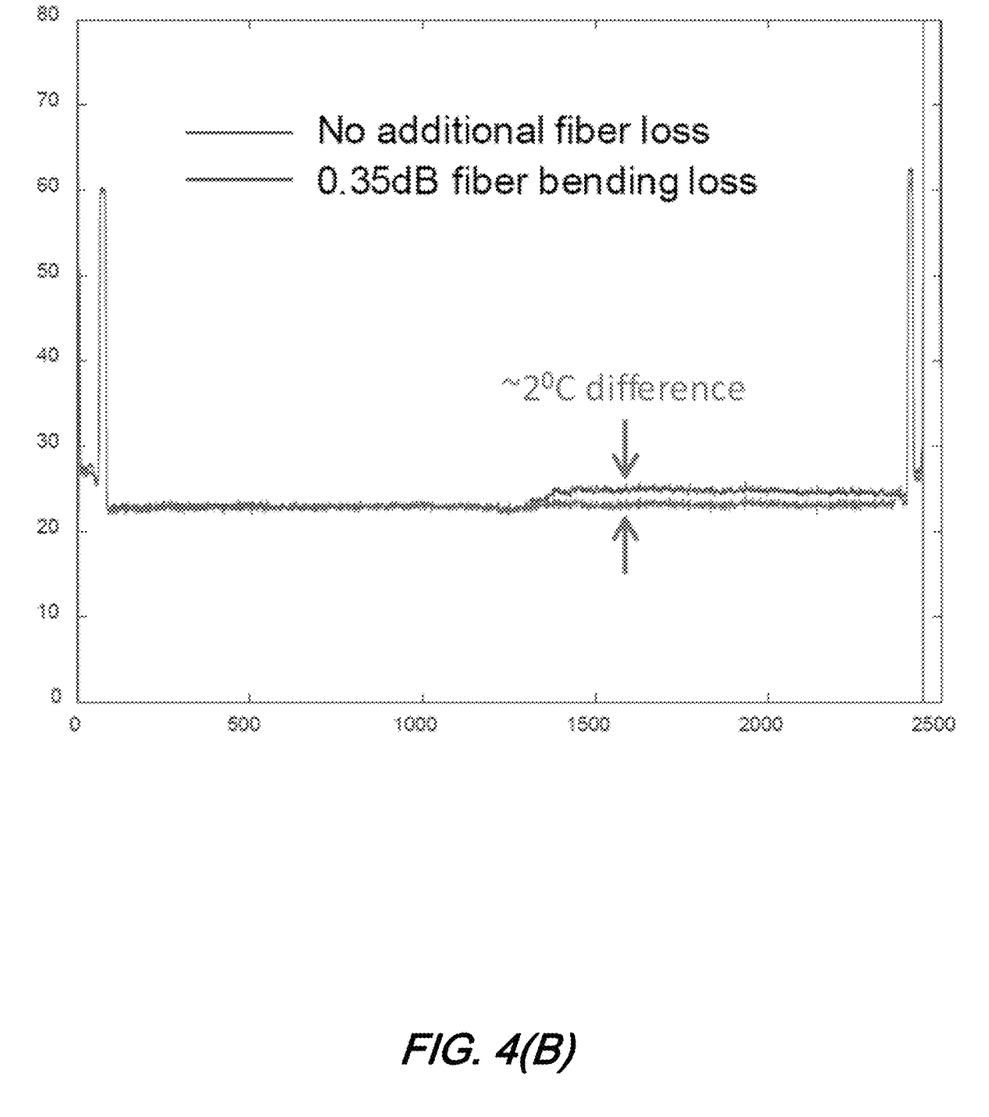
FIG. 4(B) DTS measurement with and without bending loss according to aspects of the present disclosure.

FIG. 4(A), and FIG. 4(B), are plots of: FIG. 4(A) OTDR trace for bending loss; and FIG. 4(B) DTS measurement with and without bending loss according to aspects of the present disclosure. We note that to estimate fiber degradation, a bending loss of around 0.35 dB was created inside a fiber coil which may be observed in FIG. 4(A). Using DTS for temperature measurement, this 0.35 dB bending loss induces approximately a 2° C. temperature increase. Such simple experiment is verification of our principles that DTS may be advantageously employed to monitor optical fiber degradation.

According to aspects of the present disclosure—generally speaking—temperature variations along an optical fiber cable are monitored by DTS. If temperature variations along that fiber increase and decrease within a 24 hour period, such variations are determined to be caused by ambient daytime and nighttime temperature(s). While, on the other hand, a slight increase in measured temperature every day represents additional bending loss occurring within the optical fiber cable. As those skilled in the art will appreciate, such loss may result from connector loss, splicing faults, or other events including landslide, and man-made events such as derailments, accidents, construction operations, etc.

Figure 5:
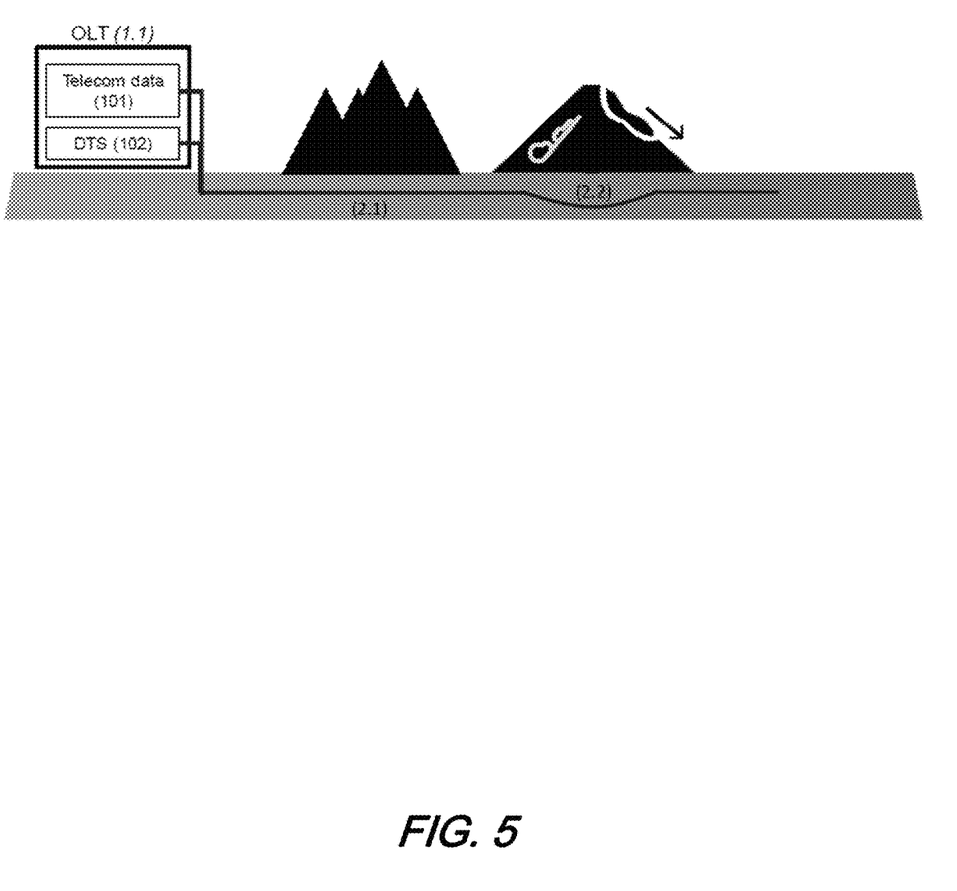
FIG. 5 is a schematic diagram illustrating fiber degradation detection by DTS wherein the degradation is caused by a landslide according to aspects of the present disclosure.

FIG. 5 is a schematic diagram illustrating fiber degradation detection by DTS wherein the degradation is caused by a landslide according to aspects of the present disclosure. With reference to this figure those skilled in the art will appreciate that applications of fiber degradation monitoring by DTS according to the present disclosure may include—in addition to the above noted events—landslides, earthquakes, and weather related events such as icing/frozen manholes, etc.

Shown in that figure is a schematic of an optical infrastructure, including an optical line terminal (OLT) 1.1 that may include facilities for transmitting and receiving telecommunications data 101 and a distributed temperature sensing 102. Such fiber sensor DTS may be positioned in the OLT for remote monitoring which may advantageously co-exist with telecommunications data transmission/receiving system 101—advantageously operating over the same physical optical fiber cable.

As shown further in the figure are illustrative sections of optical cable 2.1 and 2.2 wherein normal operation (i.e., no landslide or other event) is depicted in section 2.1 and a landslide is occurring/occurred in section 2.2. As illustrated in that figure, the optical cable section located proximate to section 2.2 undergoes a physical bending during and/or as a result of landslide. Consequently, a bending loss may be detected as being increasing day after day as the soil or other material continues to move. In such a situation, the DTS system will detect characteristic temperatures in sections with no bending as characteristic of normal, day/night variations, i.e., section 2.1. Inasmuch as the further section 2.2 will likely exhibit a continued temperature increase resulting from the bent/bending optical fiber caused by the landslide, operational maintenance may be determined/performed before any further damage to the fiber cable results.

Figure 6:
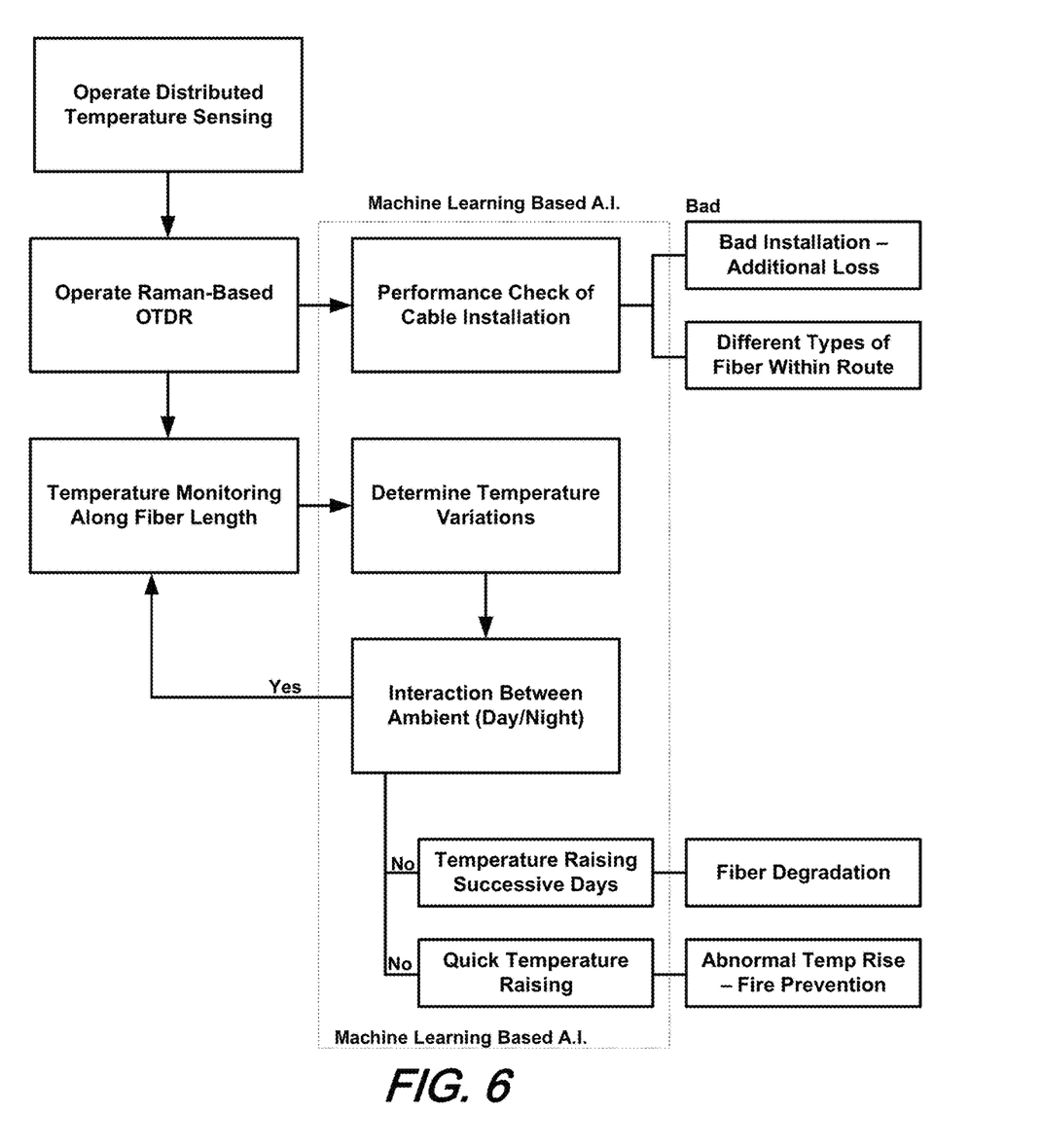
FIG. 6 is a flow diagram illustrating fiber degradation measurement by temperature sensing according to aspects of the present disclosure.

FIG. 6 is a flow diagram illustrating fiber degradation measurement by temperature sensing according to aspects of the present disclosure. As illustrated in that figure, a distributed temperature sensing operation and a Raman-based OTDR system may be operated collectively to determine overall operational health and/or type of optical fiber in a telecommunications infrastructure. While not specifically shown in that figure, it is understood and appreciated that such operations may occur simultaneously over the same physical fiber structure conveying live telecommunications traffic.

As illustrated and described previously, Raman-based OTDR (R-OTDR) when used according to aspects of the present disclosure may advantageously indicate fiber attenuation due to bending as well as different type(s) of fiber encountered. In operation, a 1450 nm wavelength is sensitive to fiber attenuations due to bending, splicing, connector loss, etc., and as such may be employed to characterize performance. Accordingly, R-OTDR is employed to characterize such installation to identify any installation problems.

Operationally, temperature monitoring is performed along the optical fiber cable route. Such monitoring measures temperatures and determines variations that occur over time. Of interest, is a normal variation that occurs between daylight (daytime) and night (nighttime) periods and such variations are noted and recorded over time. Should an unusual or otherwise abnormal temperature variation occur, then consideration may be made about its cause. For example, a temperature that does not show normal day/night variations but rather raises continuously day after day may be indicative of a fiber degradation due to—for example—the landslide or other cable bending discussed previously.

Similarly, a temperature that raises very quickly and beyond any reasonably temperature due to normal weather and outside of any normally observed variation—may be indication of a fire or other unnatural temperature.

We note that while the temperature monitoring may result from DTS systems described, additional monitoring and decision making may be performed by any of a number of machine learning/artificial intelligence (A.I.) systems and techniques. As such, an automatic monitoring/reporting architecture may be constructed that—in response to detected abnormalities—reports to a maintenance office for further investigation and possible remediation/repair.

While we have presented this disclosure using some specific examples, those skilled in the art will recognize that our teachings are not so limited. Accordingly, this disclosure should be only limited by the scope of the claims attached hereto.

The invention claimed is:

1. A distributed temperature sensing (DTS) method for determining an optical fiber degradation comprising:
   operating a DTS system to obtain temperature measurements at points along a fiber optic cable;
   determining daily temperature variability at each of the measurement points based on the temperature measurements; and
   determining an optical fiber degradation indication from the daily temperature variability at the measurement points;
   wherein the temperature measurements are obtained during a time period comprising a multiple of 24 hours; and
   wherein the optical fiber degradation is caused by a bending of the fiber optic cable.

2. The method of claim 1, wherein the bending of the fiber optic cable is caused by shifting of a ground material in which the fiber optic cable is buried.

3. A distributed temperature sensing (DTS) method for determining an optical fiber degradation comprising:
   operating a DTS system to obtain temperature measurements at points along a fiber optic cable;
   determining daily temperature variability at each of the measurement points based on the temperature measurements;
   determining an optical fiber degradation indication from the daily temperature variability at the measurement points; and
   determining an abnormal temperature indication from the daily temperature variability at the measurement points;
   wherein the abnormal temperature indication is caused by a fire proximate to the fiber optic cable.

4. The method of claim 3, further comprising generating a report to a maintenance facility indicating the abnormal temperature due to fire and location in the fiber optic cable.

5. A distributed temperature sensing (DTS) method for determining an optical fiber degradation comprising:
   operating a DTS system to obtain temperature measurements at points along a fiber optic cable;
   determining daily temperature variability at each of the measurement points based on the temperature measurements;
   determining an optical fiber degradation indication from the daily temperature variability at the measurement points;
   wherein the DTS system is a Raman-based OTDR system; and
   determining any cable installation characteristics from Raman-based OTDR data generated by the Raman-based OTDR system; by
   measuring an amplitude of stokes and anti-stokes components of the Raman-based OTDR data from which both a temperature along a length of the optical fiber and fiber optic cable health, degradation, and characteristics may be determined.

6. The method of claim 5, further comprising:
   determining a loss indicative of a bad installation from the cable installation characteristics.

* * * * *